Sept. 6, 1960 R. M. HIRSCH 2,951,894
FACSIMILE RECORDING SYSTEM
Filed June 28, 1957 2 Sheets-Sheet 1

INVENTOR
RALPH M. HIRSCH
BY
B. L. Zangwill
ATTORNEY

FACSIMILE RECORDING SYSTEM

Filed June 28, 1957

2 Sheets-Sheet 2

INVENTOR
RALPH M. HIRSCH

BY

B. L. Zangwill

ATTORNEY

United States Patent Office 2,951,894

Patented Sept. 6, 1960

2,951,894

FACSIMILE RECORDING SYSTEM

Ralph M. Hirsch, Hyattsville, Md. (205 Sussex Road, Washington Township Post Office, Westwood, N.J.)

Filed June 28, 1957, Ser. No. 668,830

12 Claims. (Cl. 178—5.2)

(Granted under Title 35, U.S. Code (1952), sec. 266)

The invention described herein may be manufactured and used by or for the Government of the United States of America for governmental purposes without the payment of any royalties thereon or therefor.

This invention relates to an ink stylus and more particularly to a stylus adapted for use with a high speed facsimile receiver.

In a high speed facsimile recorder it is necessary to provide means adapted to record the intelligence bearing facsimile signals at the same rate as received by the facsimile receiver. Among the prior art means utilized in facsimile recording machines to translate electrical signals to printed matter, are heated members adapted to leave a mark on heat sensitive paper; and the process of passing an electric arc through a suitable type of paper, said paper being chemically treated so that it will change color upon passage of said arc therethrough. Another method consists of the use of a photographic process, said process being carried out in conjunction with special photosensitive papers.

A major disadvantage found in the prior art facsimile recording methods is that each requires a special recording paper that is expensive and not always available, as for example either heat sensitive papers or papers subject to electric burning. The photographic reproducing method, in addition to requiring unique paper of a photosensitive nature, has the further disadvantage of requiring excessive time and special apparatus to develop the negatives and print the necessary positives. A further disadvantage in the prior art devices is that there is considerable radiation of intelligence bearing information, that is, those prior art methods mentioned fail to produce a sharp image, but rather one that is blurred at the edges.

It is an object of this invention to overcome the above enumerated disadvantages of the prior art.

Another object of this invention is to provide a recording means for a facsimile or telegraph recorder, capable of utilizing inexpensive, commonplace papers, as for example either Teletype or ordinary wrapping paper in emergencies.

A further object of the invention is to provide a facsimile recording means that is radiation proof whereby a sharp image is produced.

An additional object of the invention is to provide an ink stylus pen member adapted for use with a facsimile recorder.

Still an additional object of the invention is to provide an ink stylus for use with a facsimile recorder wherein flow of ink therefrom is adapted to start and stop with extreme rapidity.

Another object of the invention is to provide an ink stylus for use with a facsimile recording machine wherein said stylus is provided with a valve adapted to prevent residual ink flow after said valve closes.

Still another object of the invention is to provide a valve-type ink stylus for use with a facsimile recorder machine wherein said stylus is capable of rapid transition from flow to no-flow of ink.

An added object of the invention is to provide a means for multi-color transmission and reproduction in a facsimile recorder.

Still an added object of the invention is to provide an improved ink stylus adaptable to present facsimile equipment without modification of the latter.

In accordance with this invention an improved recording means is provided for an electric telegraph system and/or the receiver portion of a facsimile apparatus, said means making possible multi-color, as well as black and white facsimile transmissions. The improved recording means comprises, among other things, an improved ink-stylus. The stylus comprises a tapered cylindrical member, hereinafter referred to as a stylus barrel, the inner surface of which has substantially the same taper as the outer surface. The stylus barrel is adapted to hold a supply of ink and has an ink outlet opening at the narrow end thereof. A tapered, movable piston is located within the barrel and is so tapered and dimensioned as to selectively close the ink outlet opening. One end of a piston rod is connected to the piston while its opposite end is connected to a piezo-electric crystal, as for example quartz, Rochelle salt or barium-strontium-titanate. The crystal is provided with means whereby a selected potential may be placed across its faces, thereby causing flexure thereof in accordance with the well known property of such crystals. A fixed potential or bias is placed across the crystal to cause flexure of the same in such a direction as to force the piston into stylus-barrel closing position. Means are provided that electrically connect the faces of the crystal to either the facsimile or telegraph receiver, whereby an intelligence bearing signal received by said receiver is conveyed to said crystal and applied thereto as a potential across its faces in a manner similar to the aforementioned fixed bias. The means connecting the crystal to the receiver are so arranged that the signal-bearing potential placed across the crystal is opposite in polarity from, and greater in magnitude than the potential resulting from the fixed bias; as a result, the crystal is caused to flex in the opposite direction, thereby moving the piston to a stylus-barrel open position thus allowing an appropriate amount of ink to flow onto suitable recording paper, thereby providing a visual record of the incoming signal. In a facsimile recorder application of the stylus, said stylus is caused to traverse the surface of the recording paper in a manner conventional with facsimile recorders, whereby the entire transmitted image is reproduced at the receiver. It is pointed out that the piezo-electric crystal is capable of vibrations up to 20,000 c.p.s., therefore the instant invention provides a reproduction means capable of extremely rapid operation.

In addition to being capable of single color reproduction, the instant stylus, by being combined with other styli in a manner hereinafter described in detail, is capable of multi-color facsimile reproduction.

Additional objects and many of the attendant advantages of this invention will be readily appreciated as the same becomes better understood by reference to the following detailed description when considered in connection with the accompanying drawings wherein.

Figures 1, 2:
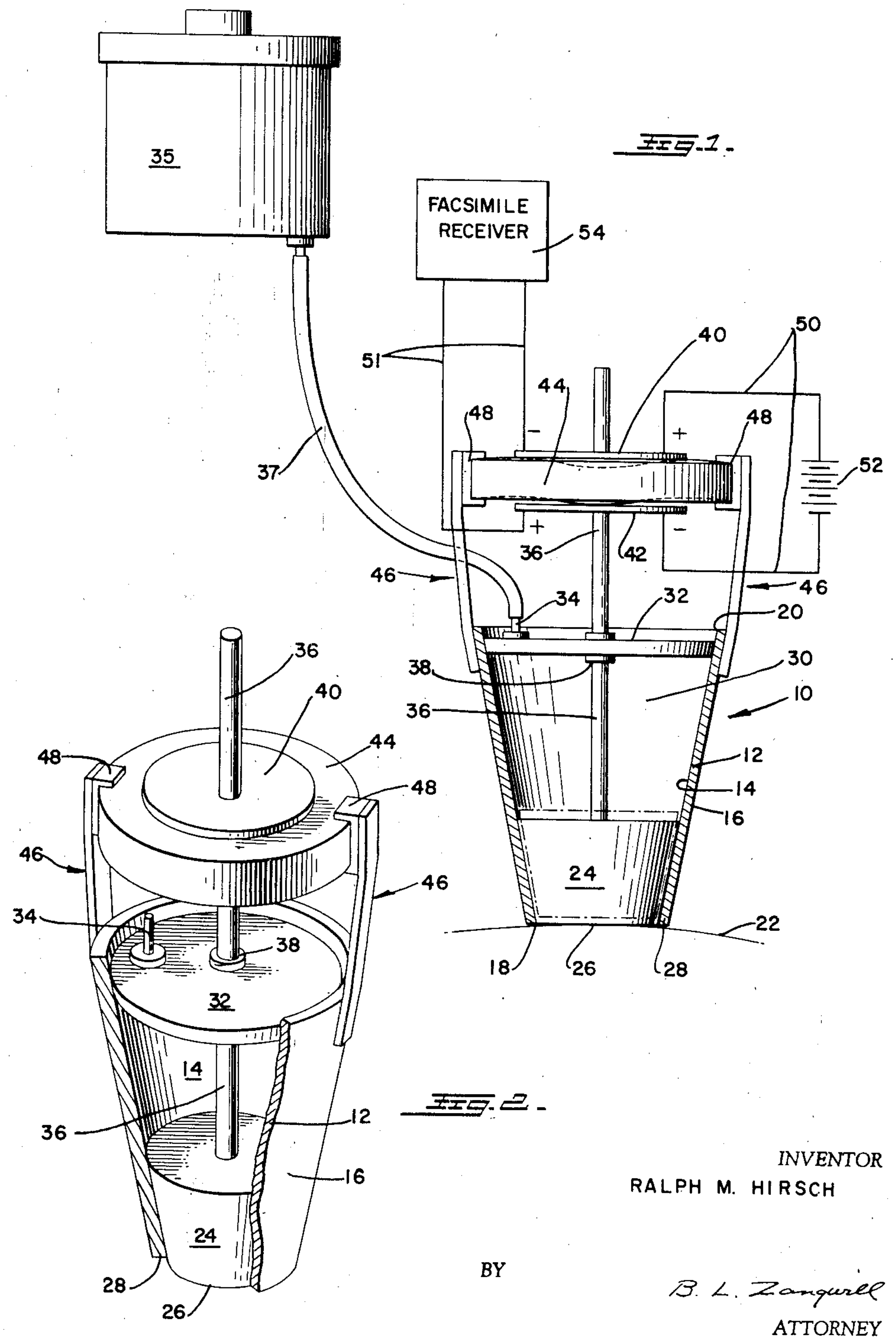
Fig. 1 is an elevational view, partially in section of the instant inventive stylus, including a schematic showing of electrical control means therefor.
Fig. 2 is a perspective view on an enlarged scale, partially broken away, of a preferred embodiment of the instant stylus, per se.

Referring now to the drawings wherein like reference characters designate like or corresponding parts throughout the several views, there is shown in Fig. 1 an ink stylus 10 produced in accordance with this invention. The stylus 10 comprises a stylus barrel 12 having a tapered inner surface 14 and a parallel tapered outer surface 16. The barrel 12 has openings 18 and 20 at its respective ends, the smaller end being adapted to be placed in contact with suitable paper 22 upon which intelligence is to be printed.

A movable piston 24 having the same taper as the inner surface 14 of the stylus barrel 12 is located within said barrel and is so dimensioned that it is adapted to rest adjacent the lower end of said barrel with its lower face 26 flush with the edge 28 of the smaller opening 18 in the stylus barrel. The piston 24 is considerably shorter in length than the stylus barrel, whereby an ink well area 30 is provided above said piston and below the upper opening 20 in the stylus barrel. The interior 14 of the stylus barrel 12 and the exterior surface of the piston 14 are respectively dimensioned, polished and honed so that when the piston is in its lowermost position within said stylus barrel it is impossible for ink to escape around the periphery of said piston. A stylus barrel cover plate 32, having an ink-inlet pipe 34, is frictionally fitted into said barrel adjacent the upper end thereof, in spaced relation with the piston, and is adapted to be removed from said barrel for purposes of cleaning the interior of the the barrel and/or removing the piston 24.

A piston rod 36 is fixedly connected to the center of the upper face of the piston 24 and extends upwardly through the stylus barrel and slidably through an axially located hole 38 provided in the cover plate 32. A pair of spaced, electrically conductive plates 40 and 42 are fixedly connected to the piston rod 36 adjacent the upper end thereof, and a piezo-electric crystal 44 is mounted on the piston rod between said plates and in contact therewith. The piezo-electric crystal 44 may be cut from any of the well known piezo-electric materials such as quartz crystal, Rochelle salt, or a barium-strontium-titanate crystal. While said piezo-electric crystal 44 may be formed from any of the piezo-electric materials referred to above, it is preferable to form said crystal from a barium-strontium-titanate material inasmuch as the latter material has considerably better strength characteristics than such piezo-electric materials as quartz crystal and Rochelle salt. In addition, for a given potential across its respective faces, a barium-strontium-titanate crystal will exert a much greater force than will a crystal formed from quartz or Rochelle salt.

It is pointed out that the piezo-electric crystal 44 is cut from its parent material, in accordance with known methods, so that when a potential is applied across its surfaces, said crystal will be subject to flexural vibrations, as distinguished from longitudinal or sheer vibrations.

The piezo-electric crystal 44 is fixedly held in spaced relation with the stylus barrel 12 by a pair of brackets 46. Each bracket 46 has one end immovably attached to the stylus barrel, and has a C-shaped clamp 48 fixedly mounted at its opposite end. The respective C-shaped clamps 48, detachably embrace opposite sides of the crystal 44, whereby said crystal is held in fixed, spaced relation with the stylus barrel 12. It is pointed out that the various elements are so proportioned that when the crystal 44 is at rest the piston 24 closes the stylus barrel outlet opening 18 so that ink cannot escape.

It is pointed out that the ink is maintained under slight pressure in the stylus by virtue of being stored in a reservoir 35 located slightly above the stylus and connected thereto by a tube 37 connected with inlet pipe 34. It should also be noted that by virtue of the vibrating crystal arrangement utilized in accordance with this invention, the piston is raised only a very slight distance and since the lower end of the piston is substantially at the lower end of the stylus, very little, if any, ink remains in the stylus below the piston and therefore residual flow after the piston closes is substantially eliminated.

The respective plates 40 and 42 on the opposite faces of the crystal 44 are connected by leads 50 to the opposite terminals of a source of fixed D.C. voltage 52 as for example a battery or the like, whereby one plate is positively charged and the other plate is negatively charged. The respective plates 40 and 42 are also connected by a pair of leads 51 to a conventional facsimile receiver 54. The plates 40 and 42 are so connected to the D.C. source 52 that the fixed potential across the piezo-electric crystal 44 causes said crystal to flex in the manner shown in dotted lines in Fig. 1. When the crystal flexes in the manner shown in the dotted lines, the piston rod 36 and piston 24 are forced downwardly in the stylus barrel 12 thereby forcing said piston into stylus barrel closing position, thereby preventing the flow of ink out of said barrel. It is pointed out that the fixed potential remains across the crystal at all times thereby tending to maintain the stylus in closed condition.

When an intelligence bearing signal is received by the facsimile receiver 54, said signal is transmitted through the leads 51 as a pulse of current to the respective plates 40 and 42. The leads from the facsimile receiver are so connected to the respective plates that when a pulse is received from said receiver, said plates are charged oppositely from the fixed charge placed thereon by the fixed D.C. source 52. In addition to being opposite in polarity from the fixed D.C. potential, the pulse from the receiver is of such a magnitude as to overcome the effect upon the crystal of the fixed D.C. source, thereby causing said piezo-electric crystal to flex in a direction opposite from that shown by the dotted lines in Fig. 1. Thus, when a pulse is transmitted to the plates 40 and 42 the crystal flexes upwardly, as viewed in Fig. 1, thereby drawing the piston rod 36 and piston 24 upwardly opening the stylus barrel and allowing ink to flow onto the rotating recording paper 22. When the pulse ends the fixed potential from source 52 causes the crystal to flex downwardly, thereby closing the stylus. By repeating the above functions upon the receipt of each pulse from the receiver, the stylus is opened and ink is allowed to flow onto the recording paper thereby reproducing the image being transmitted. The fixed D.C. potential applied across the piezo-electric crystal 44 tends to flex the same downwardly, as viewed in Fig. 1, thereby maintaining the stylus in closed position between the pulses from the facsimile receiver 54.

It is pointed out that the nature of a barium-strontium-titanate crystal is such that it is capable of 20,000 vibrations per second, thus in accordance with this invention, it is possible to open and close the stylus 10 with a frequency up to and including 20,000 cycles per second which results in a more sharply defined image than has heretofore been the case with facsimile recorders. It should be noted that a conventional ink stylus that is opened and closed by means of a solenoid or the like cannot be operated at frequencies anywhere near as great as those of which the instant invention is capable, due to the effects of inertia, friction and the like.

Figure 3:
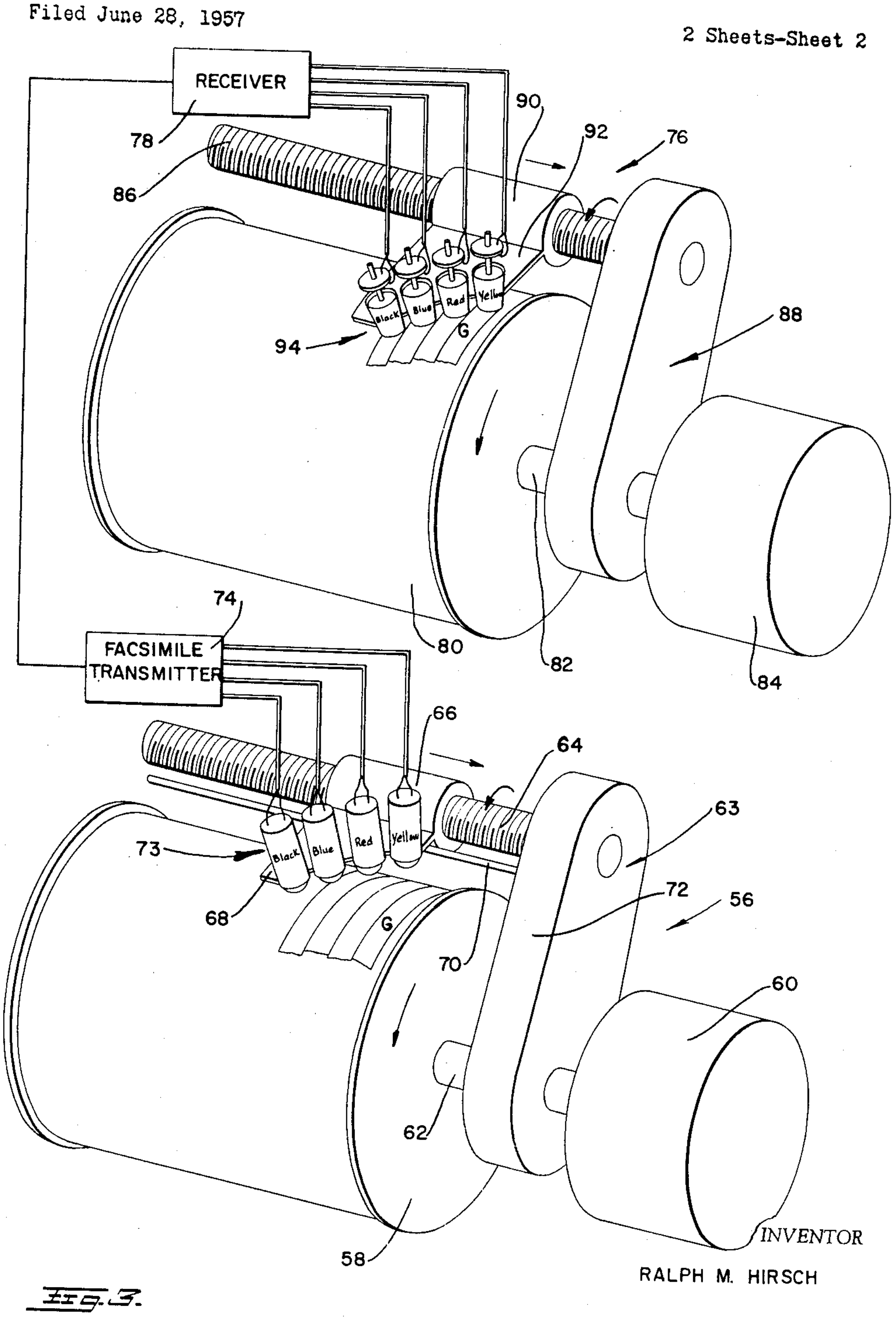
Fig. 3 is a perspective view, partially schematic, of an application of the invention to a multi-color facsimile recorder.

In Fig. 3 there is shown an application of the instant stylus 10 to a multi-color facsimile apparatus including a transmitter 56. The transmitter 56, comprises an intelligence-carrying drum 58 that is rotatable in a counter-clockwise direction by an electric motor 60 through a shaft 62. The shaft 62 that rotates the drum 58 is in turn connected, by conventional transmission means 63, to a lead screw 64 that rotates in a counter-clockwise direction.

An internally threaded sleeve 66, hereinafter referred to as a scanning sleeve, is mounted on the lead screw 64 and has a bracket 68, hereinafter referred to as a scanning bracket, fixedly mounted thereon and extending laterally therefrom over the transmitting drum 58. The scanning sleeve 66 and the bracket 68 normally tend to rotate counter-clockwise with the lead screw 64, therefore a stop member 70 is provided. The stop 70 consists of a rod having one end fixedly attached to the cover 72 on the transmission means 63, said stop member being adapted to contact the underside of the bracket 68 thereby preventing rotation thereof. Since the scanning sleeve 66 and bracket 68 are restrained against rotation, they move longitudinally of the lead screw 64 and the rotating drum 58 when said lead screw rotates.

The scanning bracket 68 has attached thereto a plurality of scanning devices 73 of a conventional photosensitive type. In accordance with this invention, four scanning devices 73 are used and are respectively sensitive to yellow, red, blue and black. For reasons hereinafter set forth, and as shown in Fig. 3, the scanning devices 73 are arranged in staggered relation. Each of the scanning devices 73 is electrically connected to a conventional facsimile transmitter 74.

The facsimile transmitter 74 is electrically connected to a facsimile receiving apparatus 76 comprising a receiver 78 and a recording drum 80 upon which a sheet of ink-sensitive paper is mounted. The recording drum 80 is connected to a drive shaft 82 that is rotated at the same speed and in the same direction as the transmitting drum 58 by a motor 84. The respective driving motors for the drums 58 and 80 are synchronized by conventional means. The receiving apparatus is also provided with a lead screw 86, said lead screw being connected to the drum driveshaft 82 by conventional belts or gearing 88.

An internally threaded sleeve 90 is mounted on the lead screw 86 and has a bracket 92 affixed thereto and extending over the recorder drum 80. A plurality of ink styli 94, each being of the type shown in Fig. 1 and connected to the receiver 78 and a source of D.C. bias, in the same manner as shown in said Fig. 1, are affixed to the bracket 92 in staggered relation in the same manner as and equal in number to, the scanning devices 72. Each stylus holds a different color ink, and the sequence of colors is the same as that of the scanning devices 72. It is pointed out that the various movable elements of the transmitter and receiver are so proportioned that the scanning devices 73 and styli 94 move at the same speed relative to the respective drums 58 and 80, both of which rotate at the same speed.

When the receiver lead screw 86 rotates in the direction shown, the initial portion of said rotation causes the sleeve 90 to rotate in a counter-clockwise direction, thereby forcing the styli 94 against the face of the receiving drum 80. Since the sleeve 90 and the styli 94 are prevented from further rotation when said styli contact the face of the receiving drum, further rotation of the receiver lead screw causes the sleeve and styli to translate in the direction shown by the arrow due to the appropriate arrangement of the screw threads on said lead screw.

*Operation*

In the facsimile transmission of multi-color material, it is pointed out that as the transmitter drum 58 rotates, the scanning members 72 translate across said drum in a left to right direction, as viewed in Fig. 3. Since each of the scanning members is sensitive to a different color, i.e. either yellow, red, blue or black, it will react only to those colors consisting either entirely of a primary color or partially made up of such a color and will therefore transmit a signal to the corresponding receiving stylus only when such a color is scanned on the transmitting drum. Thus in the event that there is a red area on the transmitted material the red-sensitive scanning member will react to said area and will send a pulse to the transmitter 74 which in turn will be transmitted to the receiver 78. A corresponding pulse will then be sent to the stylus containing red ink which will in turn be opened in the manner described above and a quantity of red ink deposited on the receiving paper. The red stylus will remain open so long as the pulse containing the red-sensitive signal is transmitted from the transmitter. When the red area passes from beneath the red-sensitive scanning member, the signal will cease and the stylus containing red ink will be closed by the structure described above.

In the event that there is a multi-color area on the transmitted material, as for example green, a combination of signals is transmitted to the receiving styli. For example, if there is a green area in the bank marked "G" in Fig. 3, the yellow-sensitive scanning member will first approach that area and, since green is composed of yellow and blue, the yellow-sensitive scanning member will react to the green color and send a pulse through the transmitter to the receiver and thence to the stylus containing yellow ink, which will in turn be opened, thereby depositing yellow ink on the receiving paper. As the transmitting and receiving drums respectively continue to rotate, the scanning members 72 and receiving styli 94 translate in the manner shown. As the scanning members 72 continue to move across the face of the transmitting drum 58, the blue sensitive scanning member will in time cross the green area "G," and since green is composed of blue as well as yellow, said blue-sensitive member will transmit a signal to the stylus containing blue ink, thereby opening said stylus and depositing blue ink on top of that area already covered by yellow ink in the manner described above. In this manner, the two colors, namely, blue and yellow will mix to produce green. It is pointed out that the transmitting and receiving devices are so synchronized, in a conventional manner, that when a given area on the transmitted material passes beneath a particular color-sensitive scanning member, the corresponding spot on the receiving drum will pass beneath the stylus containing a correspondingly colored ink, whereby it is possible to mix colors in the manner described above. It should be noted that since green does not include red, the red-sensitive scanning member will not react to the green area "G," and therefore no red ink will be deposited at the receiver.

Thus it should be noted that the instant invention provides an ink stylus readily adapted for use with standard facsimile receiving apparatus, and which is capable of utilizing ordinary, readily available ink-sensitive paper for the purpose of reproducng the image received, and does not require the use of special, expensive and frequently unavailable papers as has heretofore been the case. The instant stylus is also capable of extremely rapid response to signals received thereby and is capable of depositing ink on recording paper in response to signals received at as rapid a rate as 20,000 cycles per second which phenomenon has heretofore been impossible with conventional ink styli. Furthermore the instant invention readily adapts itself to color facsimile reproduction in the manner described above by only slight modification of any existing standard facsimile machine.

Obviously many modifications and variations of the present invention are possible in light of the above teachings. It is therefore to be understood that within the scope of the appended claims the invention may be practiced otherwise than as specifically described.

What is claimed is:

1. An electric telegraph receiver recording means comprising an ink stylus having an open-ended stylus barrel, said open end being in contact with ink sensitive means adapted to receive ink from said stylus, means for selectively opening and closing the open end in said stylus barrel, a piezo-electric crystal mechanically connected to said stylus-closing means, electrical means connecting said crystal to said receiver, to flexurally vibrate said crystal in response to signals received by said receiver and conducted to said crystal, whereby the vibrations of said crystal open and close the opening in said stylus barrel.

2. An ink stylus for use with an electric telegraphic receiver, said stylus comprising an internally tapered barrel adapted to receive ink, said barrel having an ink outlet opening at one end, a piston slidably mounted in said barrel, the external surface of said piston being tapered to the same degree as the internal surface of said barrel and dimensional so as to selectively close the ink outlet opening, a piston rod connected to said piston and extending outwardly of said barrel, a pair of electrically conductive plates fixedly and spacedly mounted on said piston rod, a piezo-electric crystal mounted on said piston rod between said plates, means for applying fixed electrical charges of opposite polarity to said respective plates, whereby said piezo-electric crystal is caused to flex toward said stylus barrel thereby closing the ink outlet opening therein, means for applying a negative and a positive charge to the previously positively and negatively charged plates respectively, in response to the receipt of an intelligence bearing electrical pulse by said telegraph receiver, whereby said crystal flexes in a direction opposite from that caused by said fixed electrical charges, thereby drawing said piston outwardly of said cylinder whereby said ink outlet is opened in response to the receipt of said intelligence bearing pulses from said telegraph receiver.

3. An electrical facsimile apparatus comprising a facsimile transmitter including a movable copy-sheet supporting member, photosensitive means for scanning said copy-sheet, means for transmitting a signal to a facsimile receiver in response to data scanned on said copy-sheet, a facsimile receiver for receiving said signals from the transmitter, signal recording means comprising a movable paper-bearing member that moves at the same rate of speed and in the same manner as the copy-sheet supporting member; an ink stylus for selectively depositing ink on said paper in response to the receipt of intelligence-bearing signals at said facsimile receiver, said stylus comprising, an ink reservoir, and valve means for opening and closing said ink reservoir whereby ink is selectively deposited on said paper, a piezo-electric crystal connected to said valve means, means electrically connecting said facsimile receiver to said piezo-electric crystal whereby an electric potential is placed across the faces of said crystal in response to the receipt of signals from said receiver, thereby causing flexural vibration of said crystal with ensuing opening and closing of said ink reservoir in response to receipt of said signals.

4. An electrical facsimile apparatus as set forth in claim 3 wherein, said stylus comprises an internally tapered ink retaining barrel member, said barrel member having an ink outlet opening at one end thereof, a piston slidably mounted in said barrel, the external surface of said piston being tapered to match the internal taper of said barrel member, and dimensioned so as to selectively close the ink outlet opening, a piston rod connected to said piston and extending outwardly of said barrel, a pair of electrically conductive plates fixedly and spacedly mounted on said piston rod and in surface contact with opposite parallel faces of said piezo-electric crystal.

5. A multi-color facsimile apparatus comprising a facsimile transmitter and receiver, said transmitter having a movable copy-sheet supporting means, scanning means for optically scanning said copy-sheet supporting means, said scanning means including individual photosensitive members respectively sensitive to yellow, red, blue and black, said photosensitive members being adapted to successively scan a given area on said copy-sheet supporting means; said facsimile receiver comprising a movable member adapted to carry an ink receptive material, a plurality of ink styli in contact with said ink receptive material and adapted to move relative thereto in the same manner that said photosensitive scanning members move relative to said copy-sheet supporting member; said styli respectively containing a supply of yellow, red, blue and black ink and being arranged in the same manner relative to said movable member as are said photosensitive scanning members relative to said copy-sheet supporting means; each ink stylus having means for selectively starting and stopping the flow of ink therefrom, said starting and stopping means being operable in response to signals received from the corresponding color-sensitive scanning member, whereby multi-color images appearing on said copy-sheet are reproduced on said ink-sensitive material.

6. A multi-color facsimile apparatus as set forth in claim 5 wherein said copy-sheet supporting means and said receiver carrying member for ink receptive material each consist of a rotatable, elongated cylinder.

7. A multi-color facsimile apparatus as set forth in claim 6 wherein said photosensitive scanning members and ink styli are arranged in staggered relation relative to the longitudinal axis of said respective rotatable cylinders; the staggered relationship of said scanning members and said styli respectively being identical, whereby the different color inks may be successively deposited one upon the other, thereby providing means for facsimile reproducing those colors composed of two or more of the primary colors yellow, red and blue.

8. A color facsimile apparatus as set forth in claim 5 wherein, said stylus comprises an internally tapered ink retaining barrel member, said barrel member having an ink outlet opening at one end thereof, a piston slidably mounted in said barrel, the external surface of said piston being tapered to match the internal taper of said barrel member, and dimensioned so as to selectively close the ink outlet opening, a piston rod connected to said piston and extending outwardly of said barrel, a pair of electrically conductive plates fixedly and spacedly mounted on said piston rod and a piezo-electric crystal sandwiched between said plates and having a pair of parallel faces thereon in juxtaposed relation with said plates.

9. A color facsimile apparatus as set forth in claim 6 wherein, said stylus comprises an internally tapered ink retaining barrel member, said barrel member having an ink outlet opening at one end thereof, a piston slidably mounted in said barrel, the external surface of said piston being tapered to match the internal taper of said barrel member, and dimensioned so as to selectively close the ink outlet opening, a piston rod connected to said piston and extending outwardly of said barrel, a pair of electrically conductive plates fixedly and spacedly mounted on said piston rod and a piezo-electric crystal sandwiched between said plates and having a pair of parallel faces thereon in juxtaposed relation with said plates.

10. A color facsimile apparatus as set forth in claim 7 wherein, said stylus comprises an internally tapered ink retaining barrel member, said barrel member having an ink outlet opening at one end thereof, a piston slidably mounted in said barrel, the external surface of said piston being tapered to match the internal taper of said barrel member, and dimensioned so as to selectively close the ink outlet opening, a piston rod connected to said piston and extending outwardly of said barrel, a pair of electrically conductive plates fixedly and spacedly mounted on said piston rod and a piezo-electric crystal sandwiched between said plates and having a pair of parallel faces thereon in juxtaposed relation with said plates.

11. An ink stylus comprising a cylindrical stylus barrel having an ink outlet at one end thereof, a movable outlet closing means, a rod member affixed to said outlet closing means and extending away from said outlet, rod actuating means comprising a piezo-electric crystal so cut as to vibrate in a flexural manner upon the application of opposite electrical charges to its respective faces; means connecting said crystal to said rod, means for applying electrical charges of opposite polarity to the respective faces of said crystal thereby causing flexure thereof, whereby said ink outlet may be selectively opened and closed upon application of said opposite electrical charges to the respective faces of said crystal.

12. An ink stylus as set forth in claim 11 wherein said stylus barrel has a tapered internal surface converging towards said ink outlet, and said outlet closing means comprises a piston member having a peripheral surface that is tapered in the same direction and to the same degree as the internal surface of said barrel, said piston being so dimensioned as to be adapted to close the ink outlet in said stylus barrel.

References Cited in the file of this patent

UNITED STATES PATENTS

| | | |
|---|---|---|
| 1,980,888 | Thomas | Nov. 13, 1934 |
| 2,291,459 | Foltz et al. | July 28, 1942 |
| 2,413,706 | Gunderson | Jan. 7, 1947 |